(12) United States Patent
Erlbacher et al.

(10) Patent No.: US 7,777,200 B2
(45) Date of Patent: Aug. 17, 2010

(54) LASER SCANNER APPARATUS FOR FLUORESCENCE MEASUREMENTS

(75) Inventors: Andreas Erlbacher, Abtenau (AT); Harald Gebetsroither, Grödig (AT); Andreas Gfrörer, Königsdorf (DE); Gyoergy Wenczel, Seekirchen (AT)

(73) Assignee: Tecan Trading AG, Mannedorf (CH)

( * ) Notice: Subject to any disclaimer, the term of this patent is extended or adjusted under 35 U.S.C. 154(b) by 0 days.

(21) Appl. No.: 12/252,748

(22) Filed: Oct. 16, 2008

(65) Prior Publication Data
US 2009/0101839 A1    Apr. 23, 2009

(30) Foreign Application Priority Data
Oct. 22, 2007    (CH)  ................................. 01641/07

(51) Int. Cl.
*G01N 21/64*    (2006.01)
(52) U.S. Cl. .................................. 250/458.1
(58) Field of Classification Search ............... 250/458.1
See application file for complete search history.

(56) References Cited

U.S. PATENT DOCUMENTS

| | | | |
|---|---|---|---|
| 5,304,810 A | 4/1994 | Amos | |
| 5,555,539 A * | 9/1996 | Kamisada et al. | 720/672 |
| 6,628,385 B1 | 9/2003 | Osipchuk et al. | |
| 6,864,097 B1 * | 3/2005 | Schembri et al. | 436/165 |
| 7,158,226 B2 * | 1/2007 | Gfrorer et al. | 356/318 |
| 2009/0065709 A1 * | 3/2009 | Fischer et al. | 250/459.1 |

FOREIGN PATENT DOCUMENTS

| | | |
|---|---|---|
| DE | 19707227 | 8/1998 |
| EP | 0142393 | 5/1985 |
| EP | 0 490 510 | 6/1992 |
| GB | 2 184 321 | 6/1987 |
| WO | WO 02/059677 | 8/2002 |

\* cited by examiner

*Primary Examiner*—Constantine Hannaher
(74) *Attorney, Agent, or Firm*—Notaro, Michalos & Zaccaria P.C.

(57) ABSTRACT

A laser scanner apparatus images and/or measures a fluorescent sample on a moveable table. At least one laser and an optical system provide two laser beams at differing wavelengths parallel to the fluorescent sample. A moveable wedge-shaped dichroic mirror deflects the laser beams through an objective toward the sample causing spatial separation of the focal points and two non-parallel emission beams. The emission beams are guided through an optical system to two detectors.

25 Claims, 4 Drawing Sheets

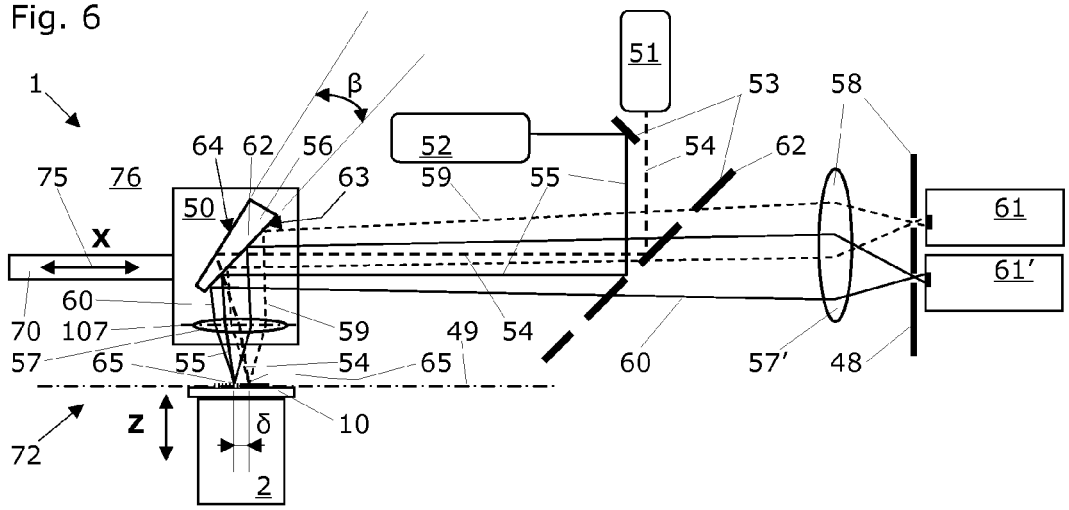
Fig. 6
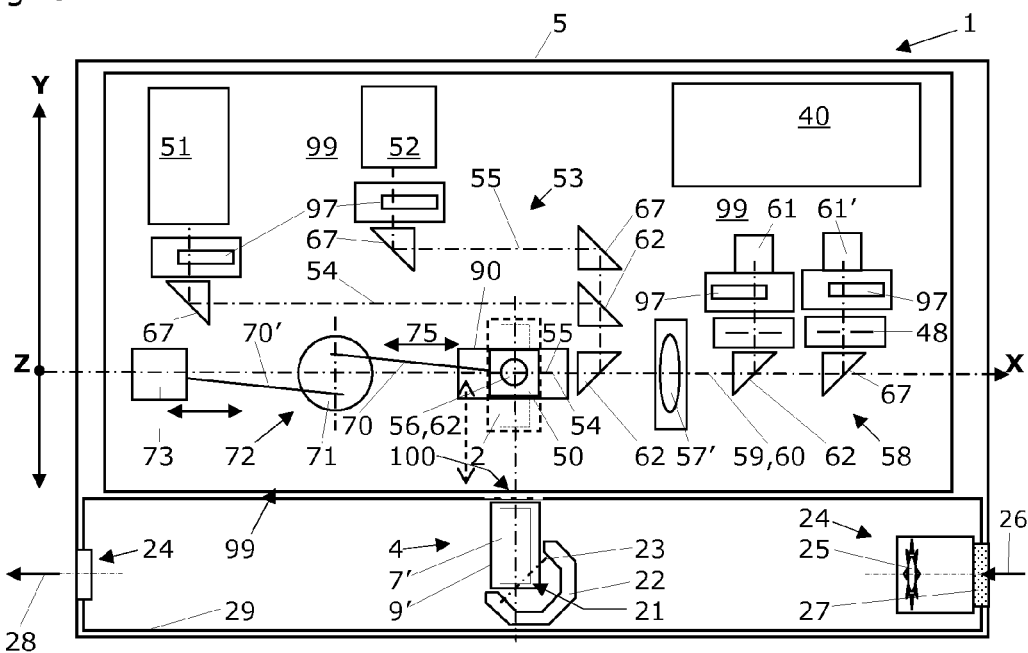
Fig. 7A
Fig. 7B
Fig. 8

LASER SCANNER APPARATUS FOR FLUORESCENCE MEASUREMENTS

RELATED PATENT APPLICATIONS

This patent application claims priority of the Swiss patent application No. CH 01641/07 filed on Oct. 22, 2007, the entire disclosure of which is incorporated herein by explicit reference for any purpose.

FIELD OF TECHNOLOGY

The invention relates to a laser scanner apparatus for imaging and/or measuring fluorescent samples which are located on specimen slides and treated with two different fluorescent dyes and also to a corresponding method. In this case, this laser scanner apparatus comprises a motor-drivable sample table with a receptacle for specimen slides in a sample plane; at least one laser and a first optical system for providing two laser beams of differing wavelength oriented parallel to each other and extending parallel to this plane; a scanner means comprising a scanner head which can move back and forth parallel to this plane and in a direction of movement and which comprises an optical deflection element for deflecting the laser beams toward the sample and an objective for focusing the laser beams on the sample in the plane. The laser scanner apparatus additionally comprises a second optical system for forwarding emission beam bundles which are triggered by the laser beams on the sample and deflected by the objective and the deflection element in a direction substantially parallel to the plane as well as two detectors for detecting the emission beam bundles of differing wavelength coming from the samples.

RELATED PRIOR ART

Conventional optical scanning microscopes have long been used for imaging fluorescent samples located on specimen slides. Confocal optical scanning microscopes are being used more and more often owing to the improved resolution. A microscope of this type is known for example from GB 2 184 321 A. This microscope guides the light of a laser source along an optical path in order to scan a sample located in the object plane of the microscope with the focused light beam. The fluorescent beam emitted by the sample is guided back through the same optical path for the purposes of descreening or descanning, separated from the excitation beam by means of a dichroic mirror and imaged on a confocal opening before a detector. Thus, an image is formed from the fluorescence of a sample, without the light directed toward the sample for the purposes of triggering the fluorescence being able to strike the detector.

Many of the commercially available microscopes are based on this design and have beam splitters or filters for breaking down the light emitted by the sample into beams having a differing wavelength range. This also allows two fluorescent dyes to be used and the emission thereof to be measured using two different detectors.

Nevertheless, all confocal scanner systems which guide the two excitation light beams having the two different wavelengths onto the same scanning spot have the drawback that the two emission signals can be delimited only spectrally. As the absorption and/or the fluorescence emission spectra of the dyes which are used usually overlap, it is not possible (especially in the case of relatively large differences in intensity) to distinguish between them reliably and quantitatively. So that first an image having a first fluorescence spectrum and then a second image having a different type of excitation beam do not have to be generated in a time-consuming manner, there have been proposed scanning microscopes and "scanner apparatuses" providing at least two differently oriented excitation beams.

U.S. Pat. No. 5,304,810 for example discloses a microscope of this type which, with two or more illumination beams which are spatially separated from one another, generates two or more illumination points which are spatially separated from one another and scans a sample simultaneously with these illumination points. The fluorescence emission beam bundles which are spatially separated from one another and simultaneously generated as a result are measured, in accordance with their respective scan position, simultaneously by means of individual detectors oriented toward these illumination points which are spatially separated from one another. U.S. Pat. No. 6,628,385 B1 also discloses a microscope of this type which generates by means of two excitation lasers two separate light spots on a sample. In this case, the two excitation beams penetrate at slightly different angles an opening in a 45° mirror and then strike an objective element. This causes the provision of two light spots which are separate from each other on the sample, an emission beam bundles being generated at each light spot. The two resulting emission beam bundles are reflected on the 45° mirror and strike a secondary lens, after which they each reach one of two detectors immediately or after a second deflection. In addition, optical separating elements, such as dichroic filters or prisms, can be positioned before the detectors which are configured as photomultipliers. A scanning or screen system arranged between the 45° mirror and the objective element can be used for scanning the samples.

WO 02/059677 A1 discloses an optical system for the excitation and measuring of fluorescence on or in samples treated with fluorescent dyes. This system comprises at least one laser for exciting the fluorescent dyes used, a mirror for deflecting the laser light in the direction of a sample, a deflection element for deflecting the light from the laser onto this mirror in a Y direction of an (in this case Cartesian) coordinate system, optics for imaging a first focal point of the laser light on the sample, a scanning unit which comprises the mirror and the optics and can move in the Y direction, a sample table which can move in the X and Z directions of the coordinate system for orienting the sample relative to the first focal point, an optical arrangement for imaging the light emitted by the sample in a hole diaphragm arranged in a second focal point and a detector for measuring the intensity of the light passing through the hole diaphragm.

In addition, these known microscopes for the highly sensitive scanning of samples arranged in a regular pattern (known as an array) are capable of scanning an entire standard specimen slide for light-optical microscopy and operate satisfactorily at medium resolution. It should however be borne in mind that if the resolution increases, additional effects, such as dynamic displacements between the color channels, can become visible. As a result, the imaging points of the red and the green channel, for example, no longer lay precisely one above the other. The relative displacement can change dynamically between the channels over the extension of the image. In addition, this displacement depends substantially on the positional precision of the sample in the focus. For these reasons, relative displacement can be corrected retrospectively using software only with great difficulty.

If the two channels are to be separated from each other not only spectrally but rather also spatially, the two focal points of the excitation lasers have to be separated from each other on the sample. The only way to achieve this is for the focused laser beams of the two lasers to strike the scan objective at an angle to one another that is small but nevertheless significant. It is generally known that all beams striking the objective at a specific angle are focused onto the same point within the focal plane. A specific angle of incidence before the objective therefore corresponds in all cases to a specific location after the objective. In this connection, it is immaterial whether the laser beam strikes the objective at the centre thereof or in any other partial region of the objective aperture; the focusing at one and the same focal point is not affected thereby. The beam angle after the objective is however different; the beams then converge at the focal point from different directions. In the exact focal point this makes no difference, but in planes lying slightly therebelow or thereabove it does. There, the beams deviate from the exact focal point at differing speeds as a function of this angle.

If then two laser beams are to be focused, in accordance with these requirements, spatially separately from each other on a sample and in the focal plane and if these laser beams therefore form an angle to each other as they strike the scan objective, this inevitably means that at least one of the two laser beams can now also no longer extend, before striking the mirror element, precisely parallel to the scan axis.

If the scanner head is then moved, the point at which the laser beam strikes the objective changes. The beam is still deflected onto the same focal point, but at different angles. Outside the focal plane, there are then obtained, in accordance with that which was stated hereinbefore, different positions in accordance with the position of the scanner head in the X direction and in accordance with the deviation of the sample plane from the exact focal plane in the Z direction. The latter deviation can never be completely ruled out within realistic apparatus tolerances and also cannot be controlled as accurately as desired as a random tolerance.

Although the described effects are per se small, they are clearly and significantly discernible in the exemplary construction at resolutions below 5 µm. The described effects can lead to the images of the two detection channels not being congruent over the entire image range and to the extent of the deviation varying in an uncontrolled manner over the image. Quantitative measurements of very small structures are as a result impossible or at least falsified. Additionally, the errors are discernible as locally varying color fringes.

The document DE 197 07 227 A1 discloses a light scanning device for exciting and detecting of emission light. The scanning device comprises a light generating unit, a deflecting unit, an imaging unit, and a confirmation unit for detection. In order to minimize scanning time at a constantly kept high resolution, the light scanning device further possesses a separation unit for separating an initial light beam bundle into at least two resulting light beam bundles. The separation unit comprises a wedge-shaped dichroic double mirror. The initial light beam bundle is reflected at the two surfaces of the wedge and thus separated. Alternatively, two wedge-shaped double mirrors form four resulting light beam bundles out of a single initial light beam bundle. In this way, simultaneous scanning of a sample is possible and thus the scanning time reduced.

The document EP 0 490 510 A discloses a sensor arrangement with a telescope in order to align the light of a field of vision with respect to detectors. A wedge-shaped beam splitter with two non-parallel surfaces reflects the light in the direction of a detection arrangement with two detectors. In this case, one surface of the beam splitter is embodied as a dichroic layer whereas the other surface is accomplished as a mirror. The dichroic layer reflects a light bundle of a first wave length range and allows a light bundle of a second wave length range to pass through. The light of the second wave length range is then reflected at the mirror surface. In this way, the two light bundles of two different wave length ranges but of the same field of vision are directed to two different regions in a single focal plane of a photodetector arrangement. Starting from a single field of vision, the formation of two different images is thus based on the separation of two different wave length ranges.

OBJECT AND SUMMARY OF THE PRESENT INVENTION

The object of the present invention is to propose an alternative laser scanner apparatus for imaging and/or measuring fluorescent samples which are located on specimen slides and treated with two different fluorescent dyes.

According to a first aspect, this object is achieved by a laser scanner apparatus according to the features as disclosed herein below by proposing a laser scanner apparatus for imaging and/or measuring fluorescent samples which are located on specimen slides and treated with two different fluorescent dyes, which apparatus comprises:

(a) a motor-drivable sample table with a receptacle for specimen slides in a sample plane;
(b) at least one laser and a first optical system for providing two laser beams of differing wavelength oriented parallel to each other and extending parallel to this plane;
(c) a scanner means comprising a scanner head which can move back and forth parallel to this plane and in a direction of movement and has an optical deflection element for deflecting the laser beams toward the sample;
(d) an objective for focusing the laser beams on the sample in the plane;
(e) a second optical system for forwarding to detectors emission beam bundles which are triggered by the laser beams on the sample and deflected by the objective and the deflection element in a direction substantially parallel to the plane, and
(f) two detectors for detecting the emission beam bundles of differing wavelength coming from the samples.

The laser scanner apparatus according to the invention is characterized in that the optical deflection element comprises a wedge-shaped dichroic mirror with front and rear dichroic surfaces arranged at an intermediate angle β to each other, the wedge-shaped dichroic mirror being adjusted in such a way that the two laser beams are each reflected at one of the surfaces, and the wedge-shaped dichroic mirror causing through the intermediate angle β a spatial separation of the two resulting focal points and the two emission beam bundles guided in the direction of the detectors.

According to a second aspect, this object is achieved by a method for operating a laser scanner apparatus according to the features disclosed herein below by proposing a method for imaging and/or measuring fluorescent samples which are located on specimen slides and treated with two different fluorescent dyes, which method includes the following steps:

(a) providing a motor-drivable sample table with a receptacle for specimen slides in a sample plane;
(b) providing two laser beams of differing wavelength oriented parallel to each other and extending parallel to this plane with at least one laser and a first optical system;
(c) deflecting the laser beams toward the sample with an optical deflection element of a scanner means comprising a scanner head which is implemented to be movable back and forth parallel to this plane and in a direction of movement;
(d) focusing the laser beams on the sample in the plane with an objective;

(e) forwarding to detectors emission beam bundles which are triggered by the laser beams on the sample and deflected by the objective and the deflection element in a direction substantially parallel to the plane with a second optical system, and (f) detecting the emission beam bundles of differing wavelength coming from the samples using two detectors.

The method according to the invention is characterized in that the optical deflection element used is a wedge-shaped dichroic mirror with front and rear dichroic surfaces arranged at an intermediate angle β to each other, the wedge-shaped dichroic mirror being adjusted in such a way that the two laser beams are each reflected at one of the surfaces, and the wedge-shaped dichroic mirror causing through the intermediate angle β a spatial separation of the two resulting focal points and the two emission beam bundles guided in the direction of the detectors.

Additional preferred features according to the invention will emerge from respectively dependent claims.

Advantages of the laser scanner apparatus according to the invention include:

Red/green images recorded using the laser scanner apparatus according to the invention are, despite the high resolution, almost congruent or can be made congruent for the entire image by a simple X/Y correction (linear shifting).

The wedge-shaped dichroic mirror used in accordance with the invention, with front and rear dichroic surfaces arranged at an intermediate angle to each other, allows at the same time spatial separation of the spots for exciting the fluorescence in the samples as well as separation of the two emission beam bundles guided in the direction of the detectors.

The pentamirror arrangement used in accordance with the invention corrects all tilting of the scanner head about an axis extending at right angles to the scan axis, so that the resulting focal points do not change their current position in the sample plane.

The counter oscillator used in accordance with the invention compensates for movement pulses of the rapidly moving scanner head, so that these pulses are not transmitted to the laser scanner apparatus.

The linear encoder (measuring rod) which is used in accordance with the invention and placed both in the optical main plane and in the scanning or screen plane defined by the two scanning laser beams allows very precise detection of the instantaneous position of the scanner head and exact calculating back to the position of the current focal points.

BRIEF INTRODUCTION OF THE ATTACHED DRAWINGS

The laser scanner apparatus according to the invention will be described hereinafter based on schematic drawings which do not limit the scope of the present invention and which illustrate examples of particularly preferred embodiments. In the drawings:

FIG. 3 shows vertical views of the specimen slide magazine with the test object magazine opened, wherein

Figure 4A:
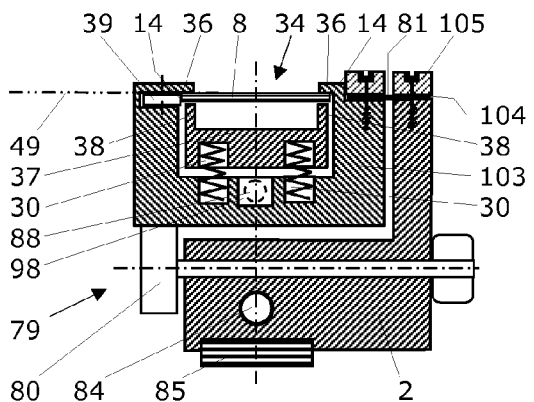
Figure 4B:
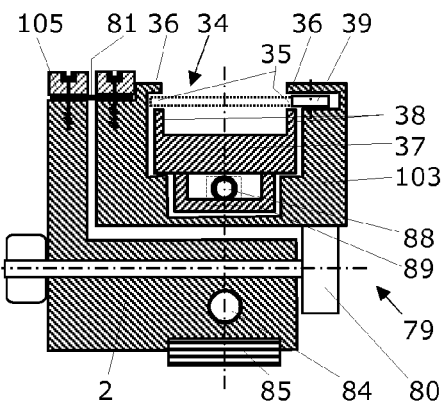
Figure 5:
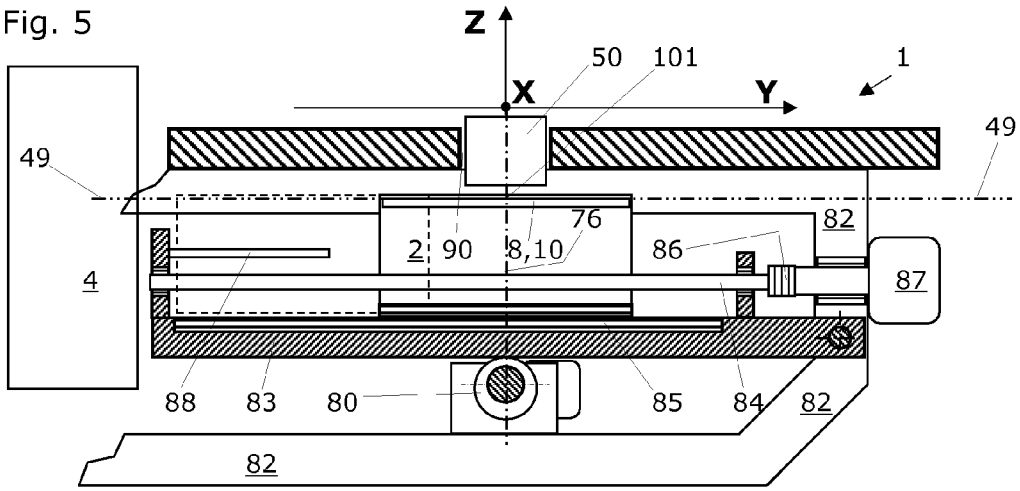

FIG. 4 shows vertical partial sections through the object table and the transverse tilting device thereof, wherein FIG. 4A shows the object table looking toward the specimen slide magazines and with a specimen slide held in a two-way manner in the closed object table, and FIG. 4B shows the object table looking away from the specimen slide magazines, with the object table opened, after the removal or prior to the insertion of a specimen slide;

FIG. 5 is a vertical partial section through the object table and the height adjustment and longitudinal tilting device thereof;

FIG. 6 is a schematic diagram with basic optical elements of the laser scanner apparatus with a scanner head according to a first embodiment;

FIG. 7 are schematic diagrams of the scanner head, wherein

FIG. 7A shows a second embodiment of the scanner head, and

Figure 9:
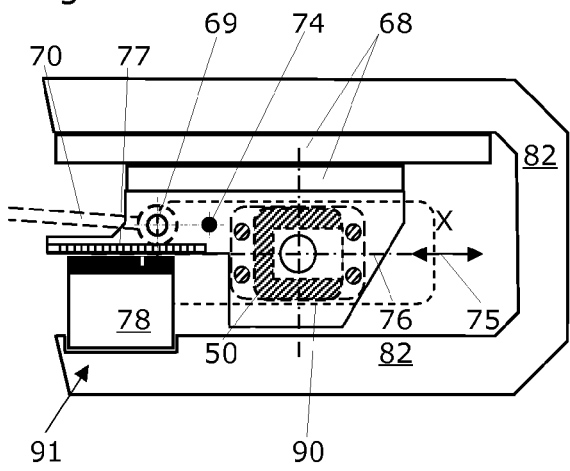
Figure 10:
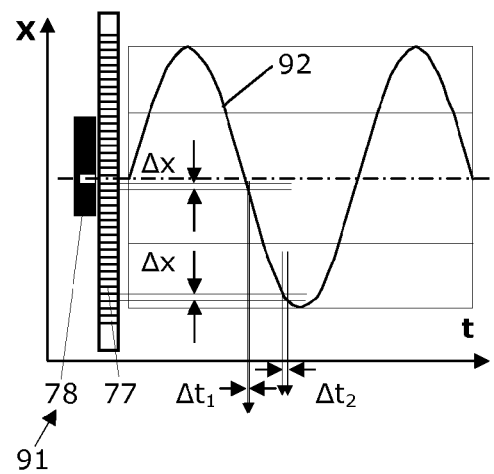
Figure 11:
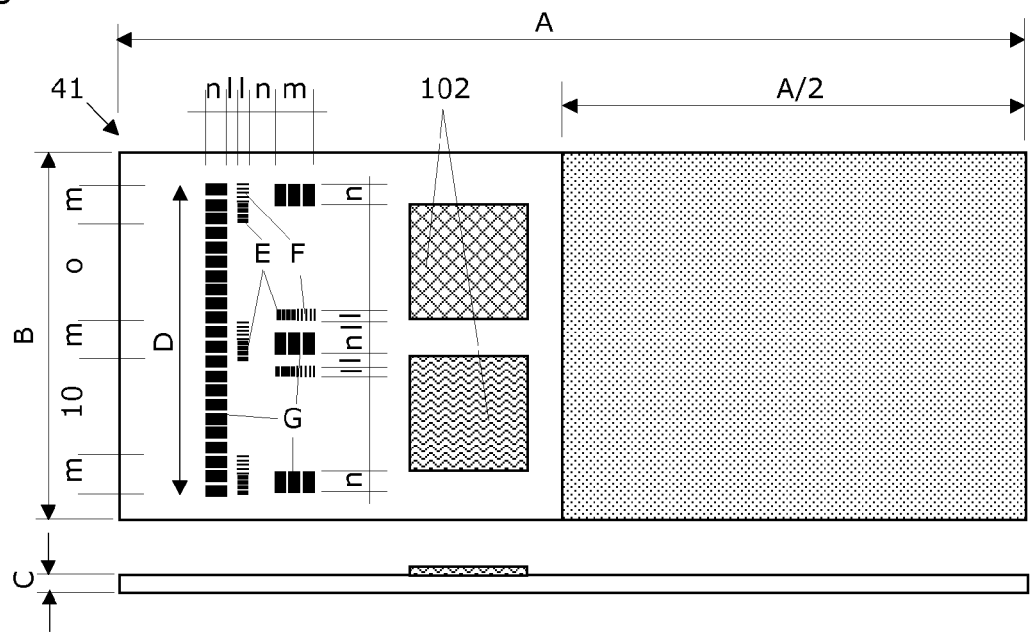
Figure 12:
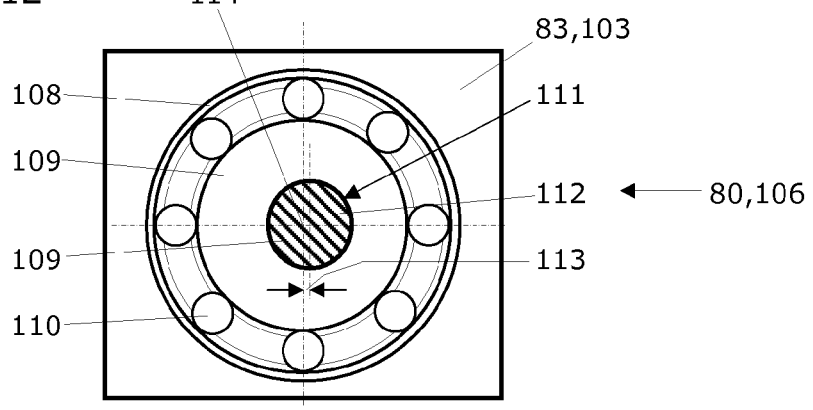

FIG. 7B shows a third embodiment of the scanner head;

FIG. 8 is a horizontal partial section through a laser scanner apparatus with basic optical elements, a scanner means with a scanner head and an object table with specimen slide magazines;

FIG. 9 is a horizontal partial section through the scanner head of the laser scanner apparatus with the associated displacement transducer;

FIG. 10 is a schematic diagram of the displacement transducer for the scanner head and the non-linear movement thereof during scanning as a X/t diagram which refers to the different periods of time ($\Delta t_1$; $\Delta t_2$) for detecting the fluorescence light emanating from an object in accordance with the position of a number of pixels ($\Delta x$) on the X axis;

FIG. 11 shows a test specimen slide having the format of a standard specimen slide for light-optical microscopy and comprising exclusively light-stable test structures; and FIG. 12 is a vertical section through an eccentric device for adjusting the focal line.

DETAILED DESCRIPTION OF THE INVENTION

Figure 1:
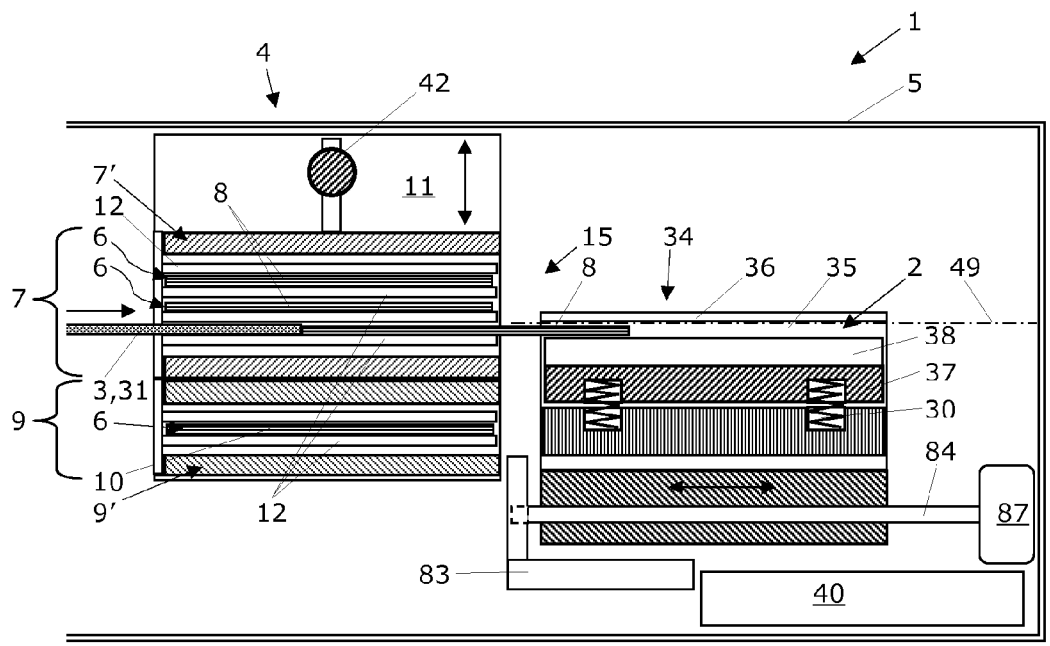
FIG. 1 is a vertical partial section through two specimen slide magazines and an object table placed therebefore during the transfer of a specimen slide from the sample magazine to the object table.

FIG. 1 is a vertical partial section through two specimen slide magazines and an object table placed therebefore during the transfer of a specimen slide from the sample magazine to the object table. These two specimen slide magazines form part of a laser scanner apparatus 1 according to the invention for imaging and/or measuring fluorescent samples which are located on specimen slides and treated with fluorescent dyes. This laser scanner apparatus comprises a sample table 2 defining a sample plane 49 and a motorized transportation device 3 for moving a specimen slide from a storage unit 4 to the sample table 2 and back. In this case, the storage unit 4 comprises a respective sample part 7, which has at least one respective bearing point 6 and is accessible during operation of the laser scanner apparatus 1 to the transportation device 3, for sample specimen slides 8 and test part 9 for test specimen slides 10. In this laser scanner apparatus according to the invention, the test part 9 is configured separately from the sample part 7 as a test part magazine 9', which is rigidly connected to the laser scanner apparatus 1, for one or more test specimen slides 10. As a result, a test specimen slide 10 stored in the test part 9 is not manually accessible to an operator when the laser scanner apparatus 1 is in operation. This has the advantage that a suitable test specimen slide can be provided at all times, without the risk of a test specimen slide 10 of this type becoming soiled or even damaged as a result of being mishandled by operators. The test part magazine 9' illustrated in the present case comprises an open insertion side 15.

In the embodiment illustrated in the present case, the sample part 7 is arranged axially above the test part 9, and the test part 9 of the storage unit 4 is rigidly connected to an adjustment plate 11, which is moveable relative to the sample table 2 of the laser scanner apparatus 1, of the storage unit 4. In this case, the adjustment plate 11 of the storage unit 4 is displaceable substantially perpendicularly relative to the sample plane 49 of the sample table 2. Thus, any desired specimen slide 8,10 can be brought to the level of the sample plane 49 defined by the sample table 2 and provided for linear transportation to the sample table 2.

Departing from this view in FIG. 1, the adjustment plate can also be fixed and thus provide an immovable connection between the laser scanner apparatus 1 and the test part magazine 9'. In such a case, the sample table 2 has to be moved relative to the test part magazine 9' if any desired specimen slide 8,10 is to be transported linearly from a sample part magazine 7' or a test part magazine 9' to the sample table 2. It is also possible to dispense with an adjustment plate 11 altogether and to fasten the test part magazine 9' at any location to the laser scanner apparatus 1 in such a way as to render a test specimen slide 10 stored in the test part 9 manually inaccessible to an operator when the laser scanner apparatus 1 is in operation.

Further alternatives (not shown) include moving a test specimen slides 10, which is already located in the sample plane 49 of the sample table 2, in this sample plane 49 in relation to a stationary sample table 2, moving the sample table 2 in this sample plane 49 in relation to a stationary test part magazine 9' or else mutual movement of the sample table 2 and test part magazine 9'. All these cases allow linear transportation of any desired specimen slide 8,10 from a sample part magazine 7' or a test part magazine 9' to the sample table 2. In addition, it is conceivable to use a robot which removes a specimen slide 8,10 from one of the magazines 7',9' and positions it on the sample table 2; in this case, the magazines 7',9' and the sample table 2 can assume almost any desired position relative to one another.

It is however preferred for the sample plane 49 of the sample table 2 to be arranged substantially horizontally, the sample table 2 carrying a specimen slide 8,10 above it. Nevertheless, the sample table 2 can also be arranged overhead, so that the specimen slide 8,10 used is arranged under the sample table. Any other desired spatial position of the sample plane 49 is in principle also conceivable, although less preferred.

The laser scanner apparatus 1 according to the first embodiment illustrated in FIG. 1 comprises preferably a housing 5, the sample part 7 being configured as a magazine 7', which can be inserted from the outside into the housing 5 of the laser scanner apparatus 1, for a large number of sample specimen slides 8. The sample part 7 can be mounted preferably reversibly on the adjustment plate 11 of the storage unit 4. In the embodiment shown, a plug-in dovetail connection connects the sample part magazine 7' to the adjustment plate 11 which in this case is vertically movable. Thus, the sample part magazine 7' can be gripped (manually or by a robot) by the handle 42 and lowered into the housing 5 in a substantially vertical direction and plugged into the dovetail 43 of the adjustment plate 11. As in this case the two magazines 7',9' are arranged perpendicularly one above the other, the test part magazine 9', which is screwed securely to the adjustment plate 11, is preferably precisely the lower stop for the sample part magazine 7' inserted into the dovetail 43.

The bearing points 6 in the sample part magazine 7' and/or in the test part magazine 9' are configured for receiving specimen slides having substantially the dimensions of a standard specimen slide for light-optical microscopy. Preferably, these bearing points 6 are separated from one another by bearing webs 12, so that these specimen slides are each based on two bearing webs 12 each extending substantially over the entire length of the specimen slides 8,10.

The sample table 2, a vertical section of which is shown in FIG. 1, is configured so as to be movable, for transferring sample specimen slides 8 or test specimen slides 10, by means of a spindle drive 84 which is arranged on a suspension 83 immediately before a storage unit 4 for specimen slides 8,10 of this type. The receptacle 34 of the sample table 2 comprises preferably two mutually opposing grooves 35 for receiving the two longitudinal edges 14 of a sample specimen slide 8 or a test specimen slide 10. The sample plane 49 is in this case preferably arranged substantially horizontally. The sample table 2 comprises, for securing a specimen slide 8,10 in a clamping manner in a direction substantially perpendicular to the surface of the specimen slides, two stationary webs 36 and a jaw 37 which can be moved resiliently toward these webs 36 and has two upright side walls 38 defining, together with the lower edges of the webs 36, the opening width of the grooves 35 (cf. also FIG. 4).

Preferably, a controller 40 monitors or governs a motor 87 which drives the spindle drive 84. As a result, the controller 40 controls the movements of the sample table 2.

Figure 2:
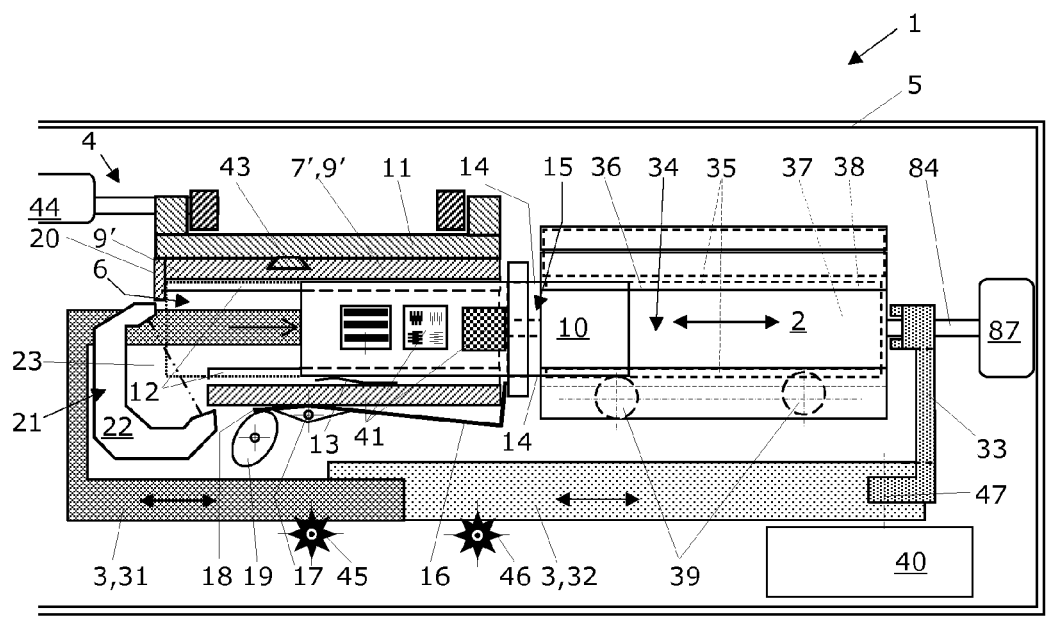
FIG. 2 is a horizontal partial section through the specimen slide magazines and a plan view onto the object table placed therebefore during the transfer of a test specimen slide from the test object magazine to the object table.

FIG. 2 is a horizontal partial section through the specimen slide magazines shown in FIG. 1 and a plan view onto the object table placed before said specimen slide magazines during the transfer of a test specimen slide from the test object magazine to the object table. The test part magazine 9' illustrated in this case comprises an open insertion side 15, which can be covered in its breadth at least partly by a respective flap 16 which extends substantially over the entire stack height of the magazine 9' and can be swiveled away individually. This flap 16 is in this case swiveled away, thus allowing the illustrated test specimen slide to be slid out from the insertion side 15 of the test part magazine 9' without being impeded by the swivel-away flap 16 in the process.

In the case of the test part magazine 9', this swivel-away flap 16 forms a part of the interlocking engagement which prevents a test specimen slide 10 stored in the test part 9 from being manually accessible to an operator when the laser scanner apparatus 1 is in operation. In the case of the sample part magazine 7', this swivel-away flap 16 allows, when folded in, handling (for example swiveling or tilting) of a magazine 7' filled with at least one sample specimen slide 8, without the risk of these specimen slides falling out. Preferably, both the sample part magazine 7' and the test part magazine 9' have, but at least the sample part magazine 7' has on its side opposing the insertion side 15, a locking plate 20 which extends substantially over the entire stack height and covers part of the breadth of this side. This locking plate 20 prevents, especially during handling of the sample part magazine 7', specimen slides from falling out on the other side.

Preferably, the flaps 16, which can be swiveled away individually in each magazine 7',9', are rotatably fastened to a respective axis 17 arranged laterally of the magazines 7',9'. The flaps 16, which can be swiveled away individually, each comprise an angular plate 18 extending preferably substantially over the entire stack height of the magazines 7',9'. These swivel-away flaps 16 are pressed, for releasing the insertion side 15 of one of the magazines 7',9', against the respective magazine 7',9' preferably by a rotatable, motor-driven eccentric roller 19. Variants (not illustrated) include moving the swivel-away flaps 16 using a lever, a ram or a slide.

So that the specimen slides 8,10 are positioned in the magazines 7',9' substantially without play, each of these bearing points 6 comprises preferably a contact spring 13 which acts resiliently on a longitudinal edge 14 of an inserted specimen slide. In addition, the spring pressure holds the respectively opposing longitudinal edge 14 of the specimen slide 8,10 in a position which is defined by the corresponding magazine 7',9' and is suitable for defining a reference for the origin of a coordinate system. Likewise, the sample table 2 is equipped preferably with movable contact parts 39 in the form of rolls (cf. FIG. 2) which also secure this longitudinal edge 14 in a defined position, thus again providing a reference for the origin of the coordinate system.

At least the sample part magazine 7' comprises, preferably at a corner opposing the insertion side 15, a control opening 21 extending substantially over the entire stack height for establishing the presence or absence of a specimen slide in a specific bearing point 6. The presence or absence of a specimen slide 8,10 in a specific bearing point 6 can be established using different methods and devices. Thus, for example (cf. FIG. 2), a light beam 23 extending substantially horizontally or a light barrier of a control device 22 can be directed obliquely through the magazines 7',9', if the control opening 21 is permeable to this light beam 23. The deflection, scattering or weakening of the light beam 23 by a specimen slide 8,10 which is present in a storage area 6 can easily be established using a light-sensitive sensor. While FIG. 2 shows a control opening 21 in the form of a "cut-off corner", the light beam 23 can also be emitted into the magazines 7',9' through the insertion side 15 and strike a sensor on the opposite, non-cut-off side; an oblique orientation relative to the direction of transportation of the specimen slides 8,10 and/or the attachment of a deflection mirror (both not shown) likewise allow detection of the specimen slides in their magazines even when the sample table 2 has been drawn close.

Further variants for establishing the presence or absence of a specimen slide in a specific bearing point 6 of one of the two magazines 7',9' are based for example on the basis of capacitive approximate evidence.

Preferably, the transportation device 3 of the laser scanner apparatus 1 comprises a discharging slide 31 which is configured so as to act substantially parallel to the sample plane 49 through the side opposing the insertion side 15 of the magazines 7',9' and for transporting a sample specimen slide 8 or a test specimen slide 10 out from its bearing point 6 and from the insertion side 15 to the sample table 2. This transportation device 3 preferably also comprises a charging slide 32 which is configured for transporting a sample specimen slide 8 or a test specimen slide 10 out of the sample table 2 and through the insertion side 15 into a storage area 6 in one of the magazines 7',9'. Particularly preferably, the charging slide 32 comprises a pivotable flap 33 which can be swiveled upward and thus be moved away via the specimen slide 8,10 which is inserted in the sample table 2, without this flap 33, which can be tilted about an axis 47, touching the specimen slide. Thus, this flap can be moved via the specimen slide 8,10 and lowered after said specimen slide, whereupon the specimen slide can be grasped by the flap 33 and drawn out of the sample table 2. The upward swiveling of the flap 33 allows the sample table 2 and the specimen slide 8,10 inserted therein to move to the location of the scanner means 72. This upward swiveling of the flap 33 about the tilt axis 47 thus allows free movement of the sample table 2, without the flap 33 being able to enter into contact with the inserted specimen slide 8,10.

Preferably, the drive 44 for the movable adjustment plate 11, the drive 45 for the discharging slide 31 and the drive 46 for the charging slide 32 are each an electric motor which is controlled and monitored by the controller 40.

The sample table 2 shown in FIG. 2 comprises, for securing a specimen slide 8,10 in a clamping manner, contact parts 39 which can move in a direction substantially parallel to the surface of the specimen slides toward at least one of the longitudinal edges 14 of the specimen slide and resiliently delimit the opening breadth of the receptacle 34. In this case, the contact parts 39, which can move toward at least one of the longitudinal edges 14 of the specimen slide, are configured preferably as rolls each having a substantially vertical axis.

Preferably, a controller 40 monitors or governs a motor 87 which drives the spindle drive 84. As a result, the controller 40 controls the movements of the sample table 2.

Figure 3A:
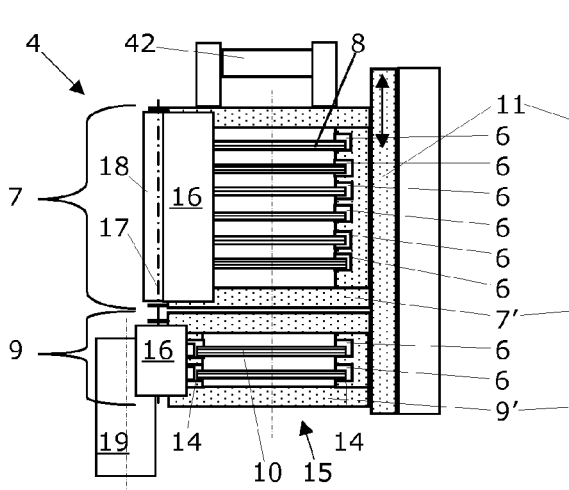
FIG. 3A is a front view, viewed from the object table, on the insertion side of the two specimen slide magazines.

FIG. 3 shows vertical views of the specimen slide magazines with the test object magazine opened. FIG. 3A is in this case a front view, viewed from the object table, of the insertion side of the two specimen slide magazines. The vertically movable adjustment plate 11 can be seen on the right-hand side and its movability is marked by a double-headed arrow. The sample part 7 is arranged just above the test part 9, the sample part magazine 7', with in this case eight sample specimen slides 8 resting in the bearing points 6, being fastened axially above the test part magazine 9' to in this case two test specimen slides 10. The swivel-away flap 16 of the sample part magazine 7' is closed, while the swivel-away flap 16 of the test part magazine 9' is opened and releases substantially the entire breadth of the insertion side of the test part magazine 9'. The swiveling-away of the swivel-away flap 16 of the test part magazine 9' is brought about in this case by the eccentric roller 19 which presses onto the angular plate 18 of this flap. The eccentric roller 19 is arranged preferably at least close to the sample plane 49 defined by the sample table 2, so that, despite the vertical displacement of the storage unit 4, the correct flap 16 is swiveled away at all times. It may clearly be seen how the contact springs of the test part magazine 9' press resiliently onto one side edge 14 of the test specimen slides 10.

Figure 3B:
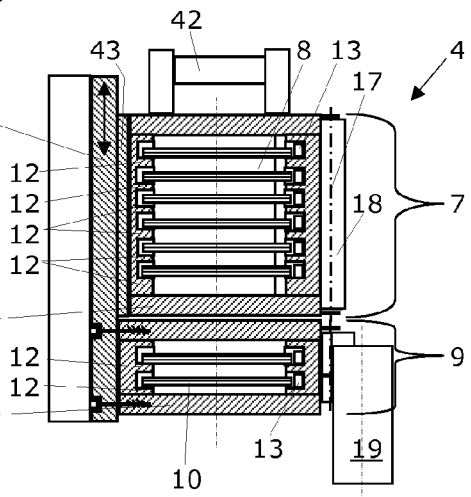
FIG. 3B is a vertical section, looking toward the object table, of the two specimen slide magazines.

FIG. 3B is a vertical section, looking toward the object table, of the two same specimen slide magazines. The vertically movable adjustment plate 11 can be seen on the left-hand side and its movability is marked by a double-headed arrow. The sample part magazine 7' is slid via the dovetail 43 of the adjustment plate 11 and is held in this case by the test part magazine 9' in a constant position on the adjustment plate 11. The test part magazine 9' is in this case screwed tight to the adjustment plate 11. The contact springs 13 of the sample part magazine 7' and the test part magazine 9' can be seen clearly in this case on the right-hand side of the specimen slide stack.

FIG. 4 shows vertical partial sections through the object table 2 and the trans-verse tilting device thereof or the tilting mechanism 79 which comprises a motor-driven eccentric 80 and a one-sided hinge pin 81. This tilting mechanism 79 serves to orient a sample or a specimen slide 8,10 relative to a focal line 101 extending in a scanning plane 76 (cf. FIG. 5). The focus of the first objective 57 and the direction of movement 75 of the scanner head 50 of the laser scanner apparatus 1 define this focal line 101. This focal line 101 itself defines, together with the optical deflection element 56 of the scanner head 50, the scanning plane 76.

This scanning plane 76 is thus defined by the direction of movement 75 of the scanner head 50 and the optical deflection element 56 thereof. This scanning plane 76 stands in this case substantially perpendicular to the sample plane 49. This focal line 101 is defined by the direction of movement 75 of the scanner head 50 and the focal point 65 of the scanner objective 57 and lies, when the apparatus is correctly adjusted, in the sample plane 49. The hinge pin 81 can be configured as an actual axle (not shown). Preferred, however, is a virtual hinge pin 81 formed by a steel spring 104. This steel spring 104 is screwed onto the sample table 2 or onto the bearing part 103 preferably by means of a respective yoke 105. This steel spring 104 causes a force opposing the eccentric 80, thus providing a simple, play-free tilting mechanism for the bearing part 103 of the sample table 2.

FIG. 4A shows the object table 2 of the laser scanner apparatus 1 looking toward the specimen slide magazines 7',9' and with a specimen slide 8 held doubled (i.e. in two ways) in the closed object table 2. The sample table 2 comprises a tilting mechanism 79 with a motor-driven eccentric 80 and a one-sided hinge pin 81, which tilting mechanism 79 can be used to orient a specimen slide 8,10 or a sample relative to a focal line 101. FIG. 12 is a section through a preferred embodiment of an eccentric device of this type. This focal line 101 lies preferably in the sample plane 49 and in a scanning plane 76 which the scanner head 50 defines with its optical deflection element 56 and its direction of movement 75. In this case, the scanning plane 76 stands preferably perpendicular to the sample plane 49 (cf. also FIG. 5). The eccentric 80, which is preferably motor-driven, can be used to correct the transverse inclination of the specimen slide 8,10 or the sample table 2, so that the focal line 101 of the scanner means 72 comes to lie exactly in the sample plane 49.

Preferably, the sample plane 49 is arranged substantially horizontally. The receptacle 34 of the sample table 2 comprises two mutually opposing grooves 35 (cf. FIG. 4B) for receiving the two longitudinal edges 14 of the sample specimen slide 8 shown or a test specimen slide 10 (not shown).

The sample table 2 comprises, for securing a specimen slide 8,10 in a clamping manner in a direction substantially perpendicular to the surface of the specimen slides, preferably a bearing part 103 with two stationary webs 36. In addition, the sample table 2 comprises a jaw 37 which can move resiliently toward these webs 36 and has two upright side walls 38. These side walls 38 define, together with the lower edges of the webs 36, the opening width of the grooves 35. The movable jaw 37 is supported by springs 30 resiliently relative to the bearing part 103 of the sample table 2, so that these springs 30 press the two upright side walls 38 of the movable jaw 37 resiliently toward the underside of the specimen slide 8. As a result, a sample specimen slide or a test specimen slide 10, which preferably has at least approximately the mass of a glass specimen slide for light-optical microscopy, is held in the sample table 2 in a clamping manner in the vertical direction.

The sample table 2 comprises, for securing a specimen slide 8,10 in a clamping manner in a direction substantially parallel to the surface of the specimen slides, contact parts 39 which can move toward at least one of the longitudinal edges 14 of the specimen slide 8 and resiliently delimit the opening breadth of the receptacle 34. These contact parts 39, which can move toward at least one of the longitudinal edges 14 of the specimen slide 8, are configured preferably as rolls each having a substantially vertical axis. The groove 35 opposing the rolls 39 defines a stop of the sample specimen slides 8 or test specimen slides 10 which is suitable for defining the axis of a coordinate system of the laser scanner apparatus 1.

Also shown dipping into a recess 98 is in this case a dimpling punch 88 which, as the sample table 2 and the storage unit 4 draw close, penetrates the sample table and, with this penetration, draws the jaw 37 and the side walls 38 away from the webs 36 of the bearing part 103.

FIG. 4B shows the object table 2, looking away from the specimen slide magazines 7',9', with the object table 2 opened, after the removal or prior to the insertion of a specimen slide 8,10. Because at this moment no specimen slide 8,10 is located in the sample table 2, the roll-like contact parts 39 are in their extreme position. The roll-like contact parts 39 are displaced from this extreme position counter to the pressure of spring elements as soon as a specimen slide 8,10 is inserted into the sample table 2. It may also clearly be seen in this case how the dimpling punch 88 strikes a ramp 89, so that the movable jaw 37 of the sample table 2 is drawn downward somewhat, thus facilitating the insertion of a specimen slides 8,10 into the receptacle 34 of the sample table 2.

FIG. 5 is a vertical partial section through the object table and also the height adjustment and longitudinal tilting device thereof. The sample plane 49 defined by the sample table 2 can be adjusted in substantially the Z direction (in this case in the vertical direction) in that the linearly displaceable sample table 2, which is linearly fastened to a suspension 83, rests, together with this suspension 83, on a motor-driven eccentric 106 and is pivotably fastened on one side to a frame 82. FIG. 12 is a section through a preferred embodiment of an eccentric device of this type. If the eccentric 106 is rotated somewhat, the suspension 83 rises or falls accordingly with the sample table 2. This movement allows the plane of the sample table 2, i.e. the sample plane 49, to be brought into correspondence with the plane of a bearing point 6 in the sample part magazine 7' or in the test part magazine 9' of the storage unit 4, thus allowing a linear transfer to take place between one of these magazines 7',9' and the sample table. Preferably, the corresponding magazine is provided in the Z direction by displacement of the movable adjustment plate 11, so that merely a possible fine adaptation to the eccentric 106 of the sample table suspension 83 must take place. The eccentric 106, which is preferably motor-driven, can be used to correct the longitudinal inclination of the specimen slide 8,10 or the sample table 2, so that the focal line 101 of the scanner means 72 comes to lay exactly in the sample plane 49. In fact, the correction of the longitudinal inclination is also accompanied by vertical displacement, i.e. along a Z axis.

For the purposes of a specimen slide transfer of this type, the sample table 2 is preferably drawn as close as possible to the storage unit 4 in the substantially horizontal Y direction. As the sample table 2 draws close to the storage unit 4, a dimpling punch 88 penetrates the sample table 2 and accordingly lowers a support of the receptacle 34 of the sample table 2 for receiving a specimen slide. As a result, the sample table 2 is provided for receiving a specimen slide 8,10. This drawing-close takes place preferably by means of a spindle drive 84 which is mounted on the suspension 83 and along a linear guide 85. The spindle drive 84 is connected to the motor 87 via a flexible coupling 86, so that exact linear guidance of the sample table 2 in substantially the Y direction can take place even when the sample plane 49 encloses a small angle of inclination to the horizontal. The main aim of the adjustability of the sample table 2 with the eccentric 80 is to orient the sample plane 49 relative to a focal line 101 defined by a scanner head 50, oscillating in the X direction (in this case perpendicularly to the plane of the drawing), of the laser scanner apparatus 1. This scanner head 50 moves very rapidly in the X direction and on the upper side of a separating plate 99. This separating plate has a scanning opening 90. Preferably, the scanner head 50 is sunk into this scanning opening 90, so that the light beams emanating therefrom strike the sample at a short distance, and that the scanner head 50 can receive as effectively as possible the fluorescence emission coming from the sample and forward it to a detector 61 or to a plurality of detectors 61,61'.

FIG. 6 is a schematic diagram with basic optical elements of the laser scanner apparatus 1 with a scanner head 50 according to a first embodiment. The laser scanner apparatus 1 for imaging and/or measuring fluorescent samples which are located on specimen slides and treated with two different fluorescent dyes comprises a motor-drivable sample table 2 with a receptacle for a sample specimen slide 10 in a sample plane 49. A first laser 51 and a second laser 52 and also a first optical system 53 provide two laser beams 54,55 of differing wavelength oriented parallel to each other and extending parallel to this plane 49. A scanner means 72 comprises a scanner head 50 which can move back and forth parallel to this plane 49 and has an optical deflection element 56 for deflecting the laser beams 54,55 toward the sample. A first objective 57 focuses the laser beams 54,55 on the sample in the plane 49. This first objective 57 has a main plane 107 arranged preferably parallel to the sample plane 49.

A second optical system 58 guides to detectors 61,61' the emission beam bundles 59,60 which are triggered by the laser beams 54,55 on the sample and deflected by the first objective 57 and the deflection element 56 in a direction substantially parallel to the plane 49. Two detectors 61,61' of this type detect the emission beam bundles 59,60 of differing wavelength coming from the samples. The openings of the diaphragms 48 have preferably a larger diameter than the focused emission beam bundles 59,60, although they can also substantially correspond to the dimensions of the focused emission beam bundles 59,60; this would provide a confocal laser scanner apparatus 1.

The optical deflection element 56 of the laser scanner apparatus 1 according to the invention comprises a wedge-shaped dichroic mirror 62 with front and rear dichroic surfaces 63,64 arranged at an intermediate angle β to each other. In this case, the wedge-shaped dichroic mirror 62 is adjusted in such a way that the two laser beams 54,55 are each reflected at one of the surfaces 63,64. In this case, the wedge-shaped dichroic mirror 62 causes through the intermediate angle β a spatial separation of the two resulting focal points 65 and the two emission beam bundles 59,60 guided in the direction of the detectors 61,61'. The two resulting focal points 65,65' are arranged at a distance δ from each other in the sample plane 49. In this first embodiment shown in FIG. 6, the optical deflection element 56 is a wedge-shaped dichroic mirror 62. Preferably, the rear dichroic surface 64 of the wedge-shaped dichroic mirror 62 is in this case configured for reflecting a first laser beam 54 and the front dichroic surface 63 thereof for reflecting a second laser beam 55 and the two emission beam bundles 59,60.

The second optical system 58 comprises elements which are known per se such as a second objective 57' which focuses the entering emission beam bundles 59,60 in a respective point. The second optical system 58 additionally comprises a diaphragm 48, the openings of which are preferably substantially larger than the focused emission beam bundles 59,60 passing through these openings. According to a particularly preferred embodiment, the laser scanner apparatus 1 is thus based on a non-confocal imaging principle. According to this, these focused emission beam bundles 59,60 each strike a detector 61,61' which measures the intensity of the respective emission beam bundles 59,60. This second objective 57' can be configured as an achromat or as a simple lens.

FIG. 7 shows schematic diagrams of the scanner head of the laser scanner apparatus according to the invention. In this case, FIG. 7A shows a second embodiment of the scanner head 50 in which the optical deflection element 56 is configured as a pentamirror arrangement 66 with a wedge-shaped dichroic mirror 62 and a simple mirror 67. As previously in the first embodiment (cf. FIG. 6), the rear dichroic surface 64 of the wedge-shaped dichroic mirror 62 is configured for reflecting a first laser beam 54 and the front dichroic surface 63 thereof for reflecting a second laser beam 55 and the two emission beam bundles 59,60.

FIG. 7B shows a third embodiment of the scanner head 50 in which the optical deflection element 56 is likewise configured as a pentamirror arrangement 66 with a wedge-shaped dichroic mirror 62 and a simple mirror 67. In contrast to the second embodiment (cf. FIG. 7A), the arrangement of the dichroic mirror 62 and the simple mirror 67 is inverted. In this case, the rear dichroic surface 64 of the wedge-shaped dichroic mirror 62 is configured for reflecting a first laser beam 54 and the front dichroic surface 63 thereof for reflecting a second laser beam 55 and also the first and second emission beam bundles 59,60.

In a further alternative embodiment of the scanner head 50 (not shown), the optical deflection element 56 is also configured as a pentamirror arrangement 66 with a wedge-shaped dichroic mirror 62 and a simple mirror 67. In this case, the rear dichroic surface 64 of the wedge-shaped dichroic mirror 62 is configured for reflecting a first laser beam 54 and the two emission beam bundles 59,60 and the front dichroic surface 63 thereof for reflecting a second laser beam 55.

According to a further alternative embodiment (not shown), the optical deflection element 56 is also configured as a pentamirror arrangement 66. In contrast to the embodiment illustrated in FIG. 7A, which is per se similar, the wedge-shaped dichroic mirror 62 is replaced by a first simple dichroic mirror which takes the place of the front surface 63. A second simple dichroic mirror or a full mirror takes the place of the rear surface 64 of the wedge-shaped dichroic mirror 62. The second simple dichroic mirror or the full mirror each encloses a corresponding intermediate angle with the first simple dichroic mirror. These variations of the reflection and transmission properties of the pentamirror arrangement 66 basically also apply to embodiments with simple mirrors arranged substantially at 45°.

It will be self-evident that the embodiments which have just been described and further combinations can be swapped over as desired. Preference is nevertheless given to the first embodiment according to FIG. 6, in which the optical deflection element 56 is configured as a wedge-shaped dichroic mirror 62, or to the second embodiment according to FIG. 7A, in which the optical deflection element 56 is configured as a pentamirror arrangement 66 with a wedge-shaped dichroic mirror 62 and a simple mirror 67. For all pentamirror arrangements 66, it is the case that the front surface 63 and the simple mirror 67 preferably enclose an angle of 22.5°.

FIG. 8 is a horizontal partial section through a laser scanner apparatus 1 with basic optical elements of a first optical system 53 for providing excitation light and of a second optical system 58 for detecting the triggered fluorescence emission of the samples, a scanner means 72 with a scanner head 50 and an object table 2 with a storage unit 4 comprising specimen slide magazines 7',9'. Preferably, all basic optical elements and the scanner means 72 are arranged on a common separating plate 99 and the sample table 2 is arranged below this separating plate 99 (cf. FIG. 5).

The basic optical elements of the first optical system 53 are arranged in a housing 5 and include at least a first laser 51 and optionally a second laser 52, filter wheels 97 for the laser beams 54,55 emanating from the laser or lasers 51,52 and also a number of dichroic mirrors 62 and simple mirrors 67 for deflecting the laser beams 54,55 from the lasers 51,52 in a direction parallel to the X direction.

The basic optical elements of the second optical system 58 are arranged in the same housing 5 and include one or more detectors 61,61', filter wheels 97 and diaphragms 48 preceding said detectors for the emission beam bundles 59,60 emanating from the samples and also a number of dichroic mirrors 62 and simple mirrors 67 for deflecting the emission beam bundles 59,60 from a direction parallel to the X direction in the direction of the detectors 61,61'.

The scanner means 72 comprises a drive 71, the scanner head 50 and preferably a counter oscillator 73 having a mass which is the same as or at least equivalent to the scanner head 50 for pulse compensation. The scanner head and counter oscillator are connected to the drive 71 by means of connecting rods 70,70' and each fastened to a precise linear guide (not shown). The drive 71 brings the scanner head 50 into a rapid back-and-forth movement in a direction of movement 75 (cf. the solid double-headed arrow) which at the same time defines the scan axis 75. In this case, the counter oscillator 73 performs at all times an opposite movement, thus allowing the separating plate 99, and therefore the laser scanner apparatus 1 as a whole, to be steadied despite the preferably high scanning speed of the scanner head 50. The scan axis 75 is parallel to the X axis or coincides precisely therewith. The scanner head 50 comprises an optical deflection element 56 which is configured, for example, as a dichroic mirror 62. This deflection element 56 can be configured as a full mirror, prism, pentaprism, pentamirror configuration or as a combination of these elements listed here. This deflection element 56 guides on the one hand the laser beams 54,55 of the first optical system 53 to the samples on the sample table 2 and on the other hand the emission beam bundles 59,60 emitted by the samples in the direction of the second optical system 58.

Perpendicularly to the X axis and scan axis 75, the direction of movement of the sample table 2 arranged below the separating plate 99 extends in the direction of the Y axis. The storage unit 4 with the sample specimen slides 8 stored in a sample part magazine and the test specimen slides 10 stored in a test part magazine 9' is arranged preferably in a region outside the separating plate 99. The presence of a specimen slide 8,10 in a specific bearing point 6 of these magazines 7',9' is preferably checked by means of a control device 22. This control device preferably comprises a light beam 23 which passes through a control opening 21 for these control purposes.

Preferably, the laser scanner apparatus 1 has a ventilation means 24 with a fan 25, an air inlet 26 with an activated carbon filter 27 and an air outlet 28 in order to reduce the exposure to ozone of the fluorescent dyes on or in the samples stored in the sample part magazine 7'. Particularly preferably, the ventilation means 24 comprises an additional housing 29 which substantially surrounds the sample part 7 with the sample specimen slides 8. This additional housing 29 is preferably arranged within the housing 5 of the laser scanner apparatus 1 and configured as a swivel-away, at least substantially closed-off region. It is in this case particularly preferred that the ventilation means 24 is accommodated in this additional housing 29 and independent of the ventilation of the laser scanner apparatus 1.

A service expert can for example open this additional housing 29 and if necessary insert or replace one or more test specimen slides in the test part magazine 9' which is otherwise inaccessible. Preferably, this additional housing 29 is configured so that it can swivel away from the separating plate 99 and has a charging opening 100 through which a respective specimen slide 8,10 can be trans-ported to the sample table 2 or into a magazine 7',9'. Preferably, the sample part 7 is arranged axially above the test part 9 of the storage unit 4 and is swiveled away together with the additional housing 29 or at least together with a part of this additional housing (which is thus opened for the service expert). Should a sample specimen slide 8 become jammed or break during transportation between the sample table 2 and the storage unit 4, the operator can remove the defective sample specimen slide 8 without providing access to the test specimen slides 10.

It is particularly preferred that a service expert slides one or more test specimen slides 10 individually into a sample part magazine 7' and inserts this sample part magazine 7' into the laser scanner apparatus 1 in the ordinary manner. Correspondingly programmed firmware in the controller 40 of the laser scanner apparatus 1 is then preferably activated by entering a personal identification number (PIN) of the service expert or by entering a code for the service experts. Once activated in this way, the firmware enables the controller 40 of the laser scanner apparatus 1 to control the automatic transportation of each of these test specimen slides 10 from the sample part magazine 7' to the sample table 2 and further into a bearing point 6 of the test part magazine 9'. According to this particularly preferred method, any manual intervention into the test part magazine 9' is rendered impossible. Only in particular emergencies and using suitable tools, a service expert could extract the test specimen slides 10 which are preferably enclosed in the additional housing 29. Preferably, the controller 40 of the laser scanner apparatus 1 according to the invention is configured to control an automated, internal instrument check which is carried out based on test specimen slides 10.

Preferably, the sample table 2 is configured so as to be motor-driven to move up to immediately before the storage unit 4 and the position and movement thereof are controlled by the controller 40. The same applies also to the adjustment plate 11 of the storage unit 4 for selecting the specimen slide 8,10 to be examined and to the rotatable eccentric roller 19 for swiveling away the flaps 16. In addition, it is preferred that the discharging slide 31 is also configured so as to be motor-driven for transporting a specimen slide 8,10 to the sample table 2 for the automated selecting and providing of a sample specimen slide 8 or test specimen slide 10 on the sample table 2 and the position and movement thereof are controlled by the controller 40. The same applies also to the charging slide 32 for transporting a specimen slide 8,10 to the storage unit 4 when said storage unit is returned to a bearing point 6 of the sample part magazine 7' or the test part magazine 9'.

FIG. 9 is a horizontal partial section through the scanner head 50 of the laser scanner apparatus 1 with the associated displacement transducer 91. A linear guide 68, on which the scanner head 50 is arranged so as to move in the X direction and dip into a scanning opening 90, is fastened to a frame 82. In this case, the X axis coincides with the direction of movement 75 of the scanner head 50, this direction of movement 75 defining, together with the first and second laser beams 54,55 which are deflected toward the sample (not shown) arranged below the scanner head 50, a scanning plane 76. This scanning plane 76 stands preferably perpendicular to the sample plane 49. The scanner head 50 comprises a measuring rod 77 which is arranged set apart from a fixed, linear measuring system 78 of the laser scanner apparatus 1 and in this scanning plane 76. The sample table 2 is preferably configured so as to be linearly movable in a Y direction, arranged at right angles to the X axis 75, of a Cartesian coordinate system and motor-driven.

The scanner head, with all its optical elements, fastening means, the measuring rod 77 and a part of the linear guide, has a centre of mass 74. This centre of mass 74 is arranged in the direction of movement 75 of the scanner head 50 on a line with a connecting rod engagement point 69, which line connects the connecting rod 70 of the scanner head 50 to the drive 71. This connecting rod engagement point 69 can be configured, for example, as an axis; it is however preferred to configure the connecting rod engagement point as a flexural pivot.

FIG. 10 is a schematic diagram of the displacement transducer 91 for the scanner head 50 and the non-linear movement thereof during scanning as an X/t diagram. This X/t diagram points to the different periods of time ($\Delta t_1$; $\Delta t_2$) for detecting a pixel ($\Delta x$) depending on the position on the X axis. The displacement transducer signal 92 corresponds roughly to a sine curve which has its peaks at the extreme points (end points) of a scan line of the laser head 50. Owing to the conversion of the direction of scanning in these end points and the movement which is slowed down as a result, the scanner head requires in proximity to these turning points a longer time ($\Delta t_2$) to cover the same distance ($\Delta x$) than at the maximum speed of the scanner head that can be achieved in a central position between the turning points, in which the same distance ($\Delta x$) is passed through in a much shorter time ($\Delta t_1$). The pixel ($\Delta x$) and the corresponding location and point in time are correlated with each other and assigned to the intensity measured at this point in time. The sum of all measured pixels then produces a two-dimensional image. The correlation of the location of these pixels in the sample plane 49 with the intensity of the fluorescence intensity measured at this location ultimately determines, in combination with the pixel size, the resolution of the laser scanner apparatus 1.

FIG. 11 shows a test specimen slide 10 which has the format of a standard specimen slide for light-optical microscopy and which comprises exclusively substantially light-stable test structures 41. The term "substantially light-stable" describes a test structure if said structure sustains no measurable damage during normal use, i.e. under radiation exposure such as conventionally occurs during testing. Irradiation for minutes or even hours of a test specimen slide 10 with a laser beam 54,55, or the leaving of a test specimen slide 10 at an unprotected location for a relatively long time (for example exposed to ambient light) is not described as "normal use".

The following Table 1 provides an overview of the most common glass specimen slides for light-optical microscopy:

| Type | Imperial: 1 × 3 inches | Metric: 25 × 75 mm |
|---|---|---|
| | Dimensions: | |
| Length × breadth (Tolerances) | 76.2 mm × 25.4 mm (±0.5 mm) | 76 mm × 25 mm (±0.5 mm) |
| | Thickness: | |
| "standard" | 1.02 mm (±0.05 mm) | |
| "thick" | 1.2 mm (±0.1 mm) | 1.02 mm (±0.05 mm) |
| | Treatment: | |
| Corners | sharp, beveled | sharp, beveled |
| Edges | sharp, beveled | sharp, beveled |
| Surfaces | bright, sandblasted, on one or both sides | bright, sandblasted, on one or both sides |

The exemplary test specimen slide 10 illustrated in FIG. 11 has a face having a length A of 75 mm, a breadth or width B of 25 mm and a thickness C of 1 mm. One half of the face A/2 is matt-finished (for example by means of grinding). The other half has a preferred linear pattern having a breadth or width D of 20 mm.

This linear pattern consists preferably of a vapor-deposited chromium layer produced by means of a mask. The upper-case letters E, F, G denote a specific number of pairs of lines per millimeter (lp/mm) and the lower-case letters l, m, n, o denote a specific mass as follows:
E=50 lp/mm; F=100 lp/mm; G=10 lp/mm;
l=0.5 mm; m=2 mm; n=1 mm; o=7 mm.

All these test structures 41 are preferably exclusively substantially light-stable and non-fluorescent.

FIG. 12 is a vertical section through an eccentric device 80,106 for adjusting the focal line 101, which is determined by the scanner head 50, relative to the sample plane 49 on the sample table 2. Each eccentric device 80,106 is preferably motor-driven and comprises a ball bearing comprising an upright outer ring 108, a rotatable inner ring 109 and a number of rolling bodies or balls 110. Preferably, a rolling bearing of this type also comprises a cage which has been omitted from FIG. 12 for the sake of clarity. The rotatable inner ring 109 of the especially preferred rolling bearing has an eccentric bore 111 in which a motor-driven drive shaft 112 is fastened so as not to be able to rotate relative to the inner ring 109. If then this drive shaft 112, which is fastened in a stationary and rotatable manner to a suspension (not shown), is rotated through a specific angle, the upright outer ring 108, which is fastened to the moving component, is raised or lowered. This raising or lowering is determined by the eccentric mass 113 which defines the distance from the centre of the drive shaft 112 to the centre of rotation 114 of the ball bearing, by the instantaneous mutual arrangement of these two centers and by the direction of rotation of the drive shaft. The advantages of these eccentric arrangements 80,106 include the fact that almost stepless and friction-free height adjustment is facilitated. It is clear that a smaller eccentric mass 113 allows lower maximum adjustability of the eccentric devices 80,106, but increases the fineness of this adjustability. The outer ring 108 can be immovably fastened to the device 83,103 to be moved; this is however not absolutely necessary, so that the outer ring 108 can also be arranged movably relative to the device 83,103 to be moved. The eccentric mass 113 can be arranged in any desired spatial direction, so that it does not necessarily define a horizontal deviation, such as is illustrated in FIG. 12.

The laser scanner apparatus according to the invention 1 is designed for the imaging and measuring of two-dimensional objects. Accordingly, a sensitivity calibration must also apply precisely to these "flat" objects. Two-dimensional fluorescence samples, which are both light-stable and chemically resistant over long periods of time, cannot however be produced or can be produced only with difficulty.

Objects extending three-dimensionally can on the other hand be measured. However, because the intensities measured on such three-dimensional objects depend markedly on the depth of field of the laser scanner apparatus and on the respective positioning in the focus (i.e. in the Z direction), three-dimensional objects of this type are not directly suitable for calibrating signal intensity or sensitivity. There are however materials 102 (known as "bulk material"), such as for example fluorescent dyes embedded in plastics material or doped glasses, which are substantially light-stable and chemically resistant.

The spatial orientation of the sample table 2 and the storage unit of the laser scanner apparatus 1 are in fact arbitrary. The same applies to the scanner means 72 which is well balanced or pulse-compensated by means of the counter oscillator 73. The sample plane 49 of the sample table 2 can also be arranged substantially horizontally but hanging overhead. Nevertheless, a stationary arrangement of the sample table according to FIGS. 1 and 2 and 4 to 7 respectively is preferred. The same features or elements of the laser scanner apparatus 1 according to the invention are each provided with the same reference numerals, even if these elements are not in all cases described in detail.

Additionally disclosed is a method according to the invention for operating a laser scanner apparatus 1 of this type for imaging and/or measuring fluorescent samples which are located on specimen slides and treated with fluorescent dyes. This method is characterized in that the optical deflection element 56 used is a wedge-shaped dichroic mirror 62 with front and rear dichroic surfaces 63,64 arranged at an intermediate angle β to each other, the wedge-shaped dichroic mirror 62 being adjusted in such a way that the two laser beams 54,55 are each reflected at one of the surfaces 63,64, and the wedge-shaped dichroic mirror 62 causing through the intermediate angle β a spatial separation both of the two resulting focal points 65 and of the two emission beam bundles 59,60 guided in the direction of the detectors 61,61'.

This method preferably uses an optical deflection element 56 configured as a pentamirror arrangement 66 with a wedge-shaped dichroic mirror 62 and a simple mirror 67, this pentamirror arrangement 66 correcting tilting of the scanner head 50 about a Y axis extending at right angles to the scan axis 75 in such a way that the resulting focal points 65 do not change their current position in the sample plane 49.

It is especially preferred that the scanner head 50 defines with its optical deflection element 56 and its direction of movement 75 a scanning plane 76 which stands perpendicular to the sample plane 49, the excursion of the scanner head 50 in the X axis 75 being measured by a measuring rod 77 which is arranged set apart from a linear measuring system 78 of the laser scanner apparatus 1 and in this scanning or screen plane 76. This measuring rod 77 is preferably arranged in the scanning or screen plane 76 or at least in direct proximity to this scanning plane 76. This measuring rod 77 is preferably also arranged in the main plane 107 of the first objective 57 (cf. FIGS. 6 and 7) or at least in direct proximity to this main plane 107.

The method according to the invention for operating a laser scanner apparatus 1 of this type for imaging and/or measuring fluorescent samples which are located on specimen slides and treated with fluorescent dyes allows a nominal limit resolution, during the imaging and/or measuring of fluorescent samples which are located on specimen slides and treated with two different fluorescent dyes, of 2.5 μm or better.

Preferred is an instrument check selected from a group comprising the carrying-out of intensity and sensitivity tests, of cross-talk, resolution and dynamic measurements, of laser noise and intensity measurements and of filter blocking and filter transmission checks and also the checking of the adjustment of optical components, the geometrical image parameters and the image orientation. Examples of geometrical image parameters include the magnification and the ascertaining and parameterization of distortions. The superimposition of two or more excitation channels and/or detection channels can also be checked. Furthermore, the laser scanner apparatus 1 is capable of controlling the autofocus function.

Preferably, a sensitivity check is carried out without a fluorescent substance, with at least one test specimen slide 10 which has at least approximately the format of a standard specimen slide for light-optical microscopy has and which comprises exclusively substantially light-stable test structures 41. Alternatively or additionally to the aforementioned sensitivity check on substantially two-dimensional test structures 41 without a fluorescent substance, an intensity measurement can also be carried out on three-dimensional, fluorescent test structures:

Instead of a normal scan or a normal scanned field in the XY direction, and thus parallel to the sample plane 49, a scan is carried out in the XZ direction (Z profile) by scanning a field standing at least substantially perpendicular on the sample plane 49. The directly measured Z profile represents the measured intensity as a function of the Z coordinate (I=I(Z)). Instead of this Z profile, the first derivation of the corresponding intensities (dI=dI(z)/dz) is then calculated, thus again providing a two-dimensional intensity distribution. The maximum of the first derivation is thus a measure of the intensity measured by the laser scanner apparatus 1 at the surface of the sample.

The materials 102 which are suitable for this calibration process can be arranged together with the vapor-deposited linear patterns on the same test specimen slide 10 or on a separate test specimen slide. These flat, three-dimensional materials 102 preferably have an extension parallel to the sample plane 49 of from 2×2 mm to 10×10 mm and have a thickness of from approximately 0.1 to 2 mm, preferably a thickness of approx. 1 mm (cf. FIG. 11).

A person skilled in the art is familiar with the function of a dichroic mirror as an optical element which is permeable to one portion of the wavelength spectrum and reflects another portion of this wavelength spectrum. A person skilled in the art will therefore refer in this case to wavelength-selective transmission and reflection. In addition, there are lasers know which are capable to emit light with different wavelengths and others (i.e. hybrid lasers) that comprise a diode laser cavity (e.g. red, 635 nm) and a solid state laser cavity (e.g. green, 532 nm) in one single casing. Combinations or variants, which will be apparent to a person skilled in the art from the present description or of the described embodiments of the present invention form part of the scope thereof.

REFERENCE NUMERALS

| | |
|---|---|
| 1 | Laser scanner apparatus |
| 2 | Sample table |
| 3 | Transportation device |
| 4 | Storage unit |
| 5 | Housing |
| 6 | Bearing point |
| 7 | Sample part |
| 7' | Sample part magazine |
| 8 | Sample specimen slide |
| 9 | Test part |
| 9' | Test part magazine |
| 10 | Test specimen slide |
| 11 | Movable adjustment plate |
| 12 | Bearing webs |
| 13 | Contact spring |
| 14 | Longitudinal edge of specimen slide |
| 15 | Insertion side |
| 16 | Swivel-away flap |
| 17 | Axis |
| 18 | Angular plate |
| 19 | Eccentric roller |
| 20 | Locking plate |
| 21 | Control opening |
| 22 | Control device |
| 23 | Light beam |
| 24 | Ventilation means |
| 25 | Fan |
| 26 | Air inlet |
| 27 | Activated carbon filter |
| 28 | Air outlet |

-continued

| | |
|---|---|
| 29 | Additional housing |
| 30 | Spring |
| 31 | Discharging slide |
| 32 | Charging slide |
| 33 | Pivotable flap |
| 34 | Receptacle |
| 35 | Opposing grooves |
| 36 | Stationary webs |
| 37 | Movable jaw |
| 38 | Upright side walls |
| 39 | Movable contact parts |
| 40 | Controller |
| 41 | Light-stable test structures |
| 42 | Handle |
| 43 | Dovetail |
| 44 | Drive for 11 |
| 45 | Drive for 31 |
| 46 | Drive for 32 |
| 47 | Tilt axis of 33 |
| 48 | Diaphragm |
| 49 | Plane, sample plane |
| 50 | Scanner head |
| 51 | First laser |
| 52 | Second laser |
| 53 | First optical system |
| 54 | First laser beam |
| 55 | Second laser beam |
| 56 | Optical deflection element |
| 57 | First objective |
| 57' | Second objective |
| 58 | Second optical system |
| 59 | First emission beam bundle |
| 60 | Second emission beam bundle |
| 61 | First detector |
| 61' | Second detector |
| 62 | Dichroic mirror |
| 63 | Front surface |
| 64 | Rear surface |
| 65 | Resulting focal points |
| 66 | Pentamirror arrangement |
| 67 | Simple mirror |
| 68 | Linear guide |
| 69, 69' | Connecting rod engagement point |
| 70, 70' | Connecting rod |
| 71 | Drive |
| 72 | Scanner means |
| 73 | Counter oscillator |
| 74 | Centre of mass |
| 75 | Direction of movement X axis, scan axis |
| 76 | Scanning plane |
| 77 | Measuring rod |
| 78 | Linear measuring system |
| 79 | Tilting mechanism |
| 80 | Eccentric, eccentric device |
| 81 | Hinge pin |
| 82 | Frame |
| 83 | Suspension |
| 84 | Spindle drive |
| 85 | Linear guide |
| 86 | Coupling |
| 87 | Motor |
| 88 | Dimpling punch |
| 89 | Ramp |
| 90 | Scanning opening |
| 91 | Displacement transducer |
| 92 | Displacement transducer signal |
| 97 | Filter wheel |
| 98 | Recess |
| 99 | Separating plate |
| 100 | Charging opening |
| 101 | Focal line |
| 102 | Flat materials |
| 103 | Bearing part of 2 |
| 104 | Steel spring |
| 105 | Yoke |
| 106 | Eccentric, eccentric device |
| 107 | Main plane of the objective 57 |
| 108 | Outer ring |
| 109 | Inner ring |
| 110 | Rolling bodies, balls |
| 111 | Eccentric bore |
| 112 | Drive shaft |
| 113 | Eccentric mass |
| 114 | Centre of rotation of the ball bearing |

What is claimed is:

1. A laser scanner apparatus (1) for imaging and/or measuring fluorescent samples which are located on specimen slides and treated with two different fluorescent dyes, comprising:
   (a) a motor-drivable sample table (2) with a receptacle (34) for specimen slides (8,10) in a sample plane (49);
   (b) at least one laser (51,52) and a first optical system (53) for providing two laser beams (54,55) of differing wavelength oriented parallel to each other and extending parallel to this plane (49);
   (c) a scanner means (72) comprising a scanner head (50) which is accomplished to be moveable parallel to this plane (49) and back and forth in a direction of movement (75) and has an optical deflection element (56) for deflecting the laser beams (54,55) toward the sample;
   (d) a first objective (57) for focusing the laser beams (54, 55) on the sample in the plane (49);
   (e) a second optical system (58) for forwarding to detectors (61,61') emission beam bundles (59,60) which are triggered by the laser beams (54,55) on the sample and deflected by the first objective (57) and the deflection element (56) in a direction substantially parallel to the plane (49), and
   (f) two detectors (61,61') for detecting the emission beam bundles (59,60) of differing wavelength coming from the samples,
   wherein the optical deflection element (56) comprises a wedge-shaped dichroic mirror (62) with front and rear dichroic surfaces (63,64) which are arranged at an intermediate angle ($\beta$) to each other, the wedge-shaped dichroic mirror (62) being adjusted in such a way that:
   (i) the two laser beams (54,55) are each reflected at one of the dichroic surfaces (63,64), and
   (ii) the wedge-shaped dichroic mirror (62) causing through the intermediate angle ($\beta$) a spatial separation of the two resulting focal points (65) by a distance $\delta$ and a spatial separation of the two emission beam bundles (59,60) that are non-parallel to each other and that are guided in the direction of the detectors (61,61').

2. The laser scanner apparatus (1) according to claim 1, wherein the optical deflection element (56) is a wedge-shaped dichroic mirror (62) or is configured as a pentamirror arrangement (66) with a wedge-shaped dichroic mirror (62) and a simple mirror (67).

3. The laser scanner apparatus (1) according to claim 1, wherein the rear dichroic surface (64) of the wedge-shaped dichroic mirror (62) is configured for reflecting a first laser beam (54) and the front dichroic surface (63) thereof for reflecting a second laser beam (55) and the two emission beam bundles (59,60).

4. The laser scanner apparatus (1) according to claim 1, wherein the rear dichroic surface (64) of the wedge-shaped dichroic mirror (62) is configured for reflecting a first laser beam (54) and a first emission beam bundle (59) and the front dichroic surface (63) thereof for reflecting a second laser beam (55) and a second emission beam bundle (60).

5. The laser scanner apparatus (1) according to claim 1, wherein the scanner head (50) is displaceably fastened to a linear guide (68), which defines a direction of movement (75) of the scanner head (50), and has a connecting rod engagement point (69) which is connected to the drive (71) of the scanner means (72) via a connecting rod (70).

6. The laser scanner apparatus (1) according to claim 5, wherein the connecting rod engagement point (69) of the scanner head (50) is arranged in the direction of movement (75) on a line with the centre of mass (74) of the scanner head (50).

7. The laser scanner apparatus (1) according to claim 6, wherein the direction of movement (75) of the scanner head (50) defines an X axis or scan axis and the sample table (2) is linearly movable in a Y direction, arranged at right angles thereto, of a Cartesian coordinate system.

8. The laser scanner apparatus (1) according to claim 1, wherein the scanner head (50) defines with its optical deflection element (56) and its direction of movement (75) a scanning plane (76), the scanner head (50) comprising a measuring rod (77) which is arranged set apart from a linear measuring system (78) of the laser scanner apparatus (1) and in this scanning plane (76).

9. The laser scanner apparatus (1) according to claim 1, wherein the scanner head (50) comprises a measuring rod (77) which is arranged at least in proximity to the main plane (107) of the first objective (57).

10. The laser scanner apparatus (1) according to claim 1, wherein the scanner means (72) comprises a counter oscillator (73) which is displaceably fastened to a linear guide and has a connecting rod engagement point (69') which is connected to the drive (71) of the scanner means (72) via a connecting rod (70').

11. The laser scanner apparatus (1) according to claim 1, wherein the sample plane (49) is arranged substantially horizontally.

12. The laser scanner apparatus (1) according to claim 1, wherein the sample table (2) comprises a tilting mechanism (79) with a motor-driven eccentric (80) and a one-sided hinge pin (81), which tilting mechanism (79) allows a specimen slide (8,10) or a sample to be oriented relative to a focal line (101).

13. The laser scanner apparatus (1) according to claim 1, wherein the laser scanner apparatus (1) comprises a frame (82) and a suspension (83) on which the sample table (2) is moveable linearly in a Y direction by means of a spindle drive (84), this suspension (83) being pivotably fastened to the frame (82) resting on a motor-driven eccentric (80) which is carried by the frame (82) and which is accomplished to be usable for adjusting the receptacle (34) of the sample table and thus the sample plane (49) in a substantially perpendicular Z direction.

14. The laser scanner apparatus (1) according to claim 1, wherein for the purpose of transferring sample specimen slides (8) or test specimen slides (10), the sample table (2) is configured so as to be able to move up to immediately before a storage unit (4) for specimen slides (8,10) of this type.

15. The laser scanner apparatus (1) according to claim 14, wherein the storage unit (4) comprises a respective sample part (7), which has at least one respective bearing point (6) and is accessible during operation of the laser scanner apparatus (1) to a transportation device (3), for sample specimen slides (8) and test part (9) for test specimen slides (10), the test part (9) being configured separately from the sample part (7) and as a test part magazine (9'), which is rigidly connected to the laser scanner apparatus (1), for one or more test specimen slides (10), as a result of which a test specimen slide (10) stored in the test part (9) is not manually accessible to an operator when the laser scanner apparatus (1) is in operation.

16. The laser scanner apparatus (1) according to claim 1, wherein the receptacle (34) of the sample table (2) comprises two mutually opposing grooves (35) for receiving the two longitudinal edges (14) of a sample specimen slide (8) or a test specimen slide (10).

17. The laser scanner apparatus (1) according to claim 16, wherein the sample table (2) comprises, for securing a specimen slide (8,10) in a clamping manner in a direction substantially perpendicular to the surface of the specimen slides, two stationary webs (36) and a jaw (37) which is accomplished to move resiliently toward these webs (36) and has two upright side walls (38) which define, together with the lower edges of the webs (36), the opening width of the grooves (35).

18. The laser scanner apparatus (1) according to claim 16, wherein the sample table (2) comprises, for securing a specimen slide (8,10) in a clamping manner in a direction substantially parallel to the surface of the specimen slides, contact parts (39) which are moveable toward at least one of the longitudinal edges (14) of the specimen slide and resiliently delimit the opening breadth of the receptacle (34).

19. The laser scanner apparatus (1) according to claim 18, wherein the contact parts (39), which are moveable toward at least one of the longitudinal edges (14) of the specimen slide, are configured as rolls each having a substantially vertical axis.

20. The laser scanner apparatus (1) according to claim 1, wherein the laser scanner apparatus (1) comprises a controller (40) which is configured for controlling an automated, internal instrument check carried out based on test specimen slides (10).

21. A method for operating a laser scanner apparatus (1) for imaging and/or measuring fluorescent samples which are located on specimen slides and treated with two different fluorescent dyes, which method includes the following steps:
   (a) providing a motor-drivable sample table (2) with a receptacle (34) for specimen slides (8,10) in a sample plane (49);
   (b) providing two laser beams (54,55) of differing wavelength oriented parallel to each other and extending parallel to this plane (49) with at least one laser (51,52) and a first optical system (53);
   (c) deflecting the laser beams (54,55) toward the sample with an optical deflection element (56) of a scanner means (72) comprising a scanner head (50) which is moveable back and forth parallel to this plane (49) and in a direction of movement (75);
   (d) focusing the laser beams (54,55) on the sample in the plane (49) with a first objective (57);
   (e) forwarding to detectors (61,61') emission beam bundles (59,60) which are triggered by the laser beams (54,55) on the sample and deflected by the first objective (57) and the deflection element (56) in a direction substantially parallel to the plane (49) with a second optical system (58), and
   (f) detecting the emission beam bundles (59,60) of differing wavelength coming from the samples using two detectors (61,61'),
   wherein the optical deflection element (56) used is a wedge-shaped dichroic mirror (62) with front and rear dichroic surfaces (63,64) arranged at an intermediate angle (β) to each other, the wedge-shaped dichroic mirror (62) being adjusted in such a way that:
(i) the two laser beams (54,55) are each reflected at one of the dichroic surfaces (63,64), and
(ii) the wedge-shaped dichroic mirror (62) causing through the intermediate angle (β) a spatial separation of the two resulting focal points (65) by a distance δ and a spatial separation of the two emission beam bundles (59,60) that are non-parallel to each other and that are guided in the direction of the detectors (61,61').

22. The method according to claim 21,
wherein an optical deflection element (56) configured as a pentamirror arrangement (66) with a wedge-shaped dichroic mirror (62) and a simple mirror (67) is used, this pentamirror arrangement (66) correcting tilting of the scanner head (50) about an Y axis extending at right angles to the scan axis (75) in such a way that the resulting focal points (65) do not change their current position in the sample plane (49).

23. The method according to claim 21,
wherein the scanner head (50) defines with its optical deflection element (56) and its direction of movement (75) a scanning plane (76), the excursion of the scanner head (50) in the X axis (75) being measured with a measuring rod (77) which is arranged set apart from a linear measuring system (78) of the laser scanner apparatus (1) in this scanning plane (76).

24. The method according to claim 21,
wherein the excursion of the scanner head (50) in the X axis (75) is measured with a measuring rod (77) which is arranged at least in proximity to the main plane (107) of the first objective (57).

25. The method according to claim 21,
wherein the nominal limit resolution during the imaging and/or measuring of fluorescent samples which are located on specimen slides and treated with two different fluorescent dyes is 2.5 μm or better.

* * * * *